INVENTORS
M.M. FOURROUX
R.L. KINDRED
BY
Hudson & Young
ATTORNEYS

INVENTORS
M. M. FOURROUX
R. L. KINDRED
BY
*Hudson & Young*
ATTORNEYS 3,095,728
FLUID MIXTURE ANALYSIS
Raymond L. Kindred and Melvin M. Fourroux, Bartlesville, Okla., assignors to Phillips Petroleum Company, a corporation of Delaware
Filed May 12, 1960, Ser. No. 28,637
7 Claims. (Cl. 73—23)

This invention relates to the analysis of fluid streams to determine selected properties thereof.

In the operation of a natural gas processing system for the extraction of natural gasoline and liquefied petroleum gas fractions, the residue gas is recovered for use or sale as a heating medium. When such a residue gas is to be sold, it is generally necessary that the heating value of the gas meet certain specified minimum requirements. If the heating value does not meet these requirements, additional fractions having higher heating value are added. This requires that some measurement be made of the heating value of such a residue gas. Heretofore, this has generally been accomplished by the use of calorimeters. While these calorimeters are capable of making the necessary measurements, it would be desirable to have apparatus which is capable of operating without a flame and in a simpler manner.

In accordance with the present invention, a system is provided for analyzing fluid mixtures to determine selected properties thereof, such as the heating value of the mixture. This is accomplished by means of a chromatographic analyzer which provides a series of output signals representative of the concentrations of the constituents of the fluid mixture. These signals are adjusted in magnitude to correspond to the heating value, or other property to be measured, such as specific gravity, of each constituent. The adjusted signals are then integrated to provide an output signal representative of the composite selected property of the fluid mixture.

Accordingly, it is an object of this invention to provide apparatus for measuring selected properties of fluid mixtures.

Another object is to provide apparatus for measuring the heating value of a combustible fluid mixture.

A further object is to provide an integrating chromatographic analyzer.

Other objects, advantages and features of the invention should become apparent from the following detailed description, taken in conjunction with the accompanying drawing wherein.

Figure 1:
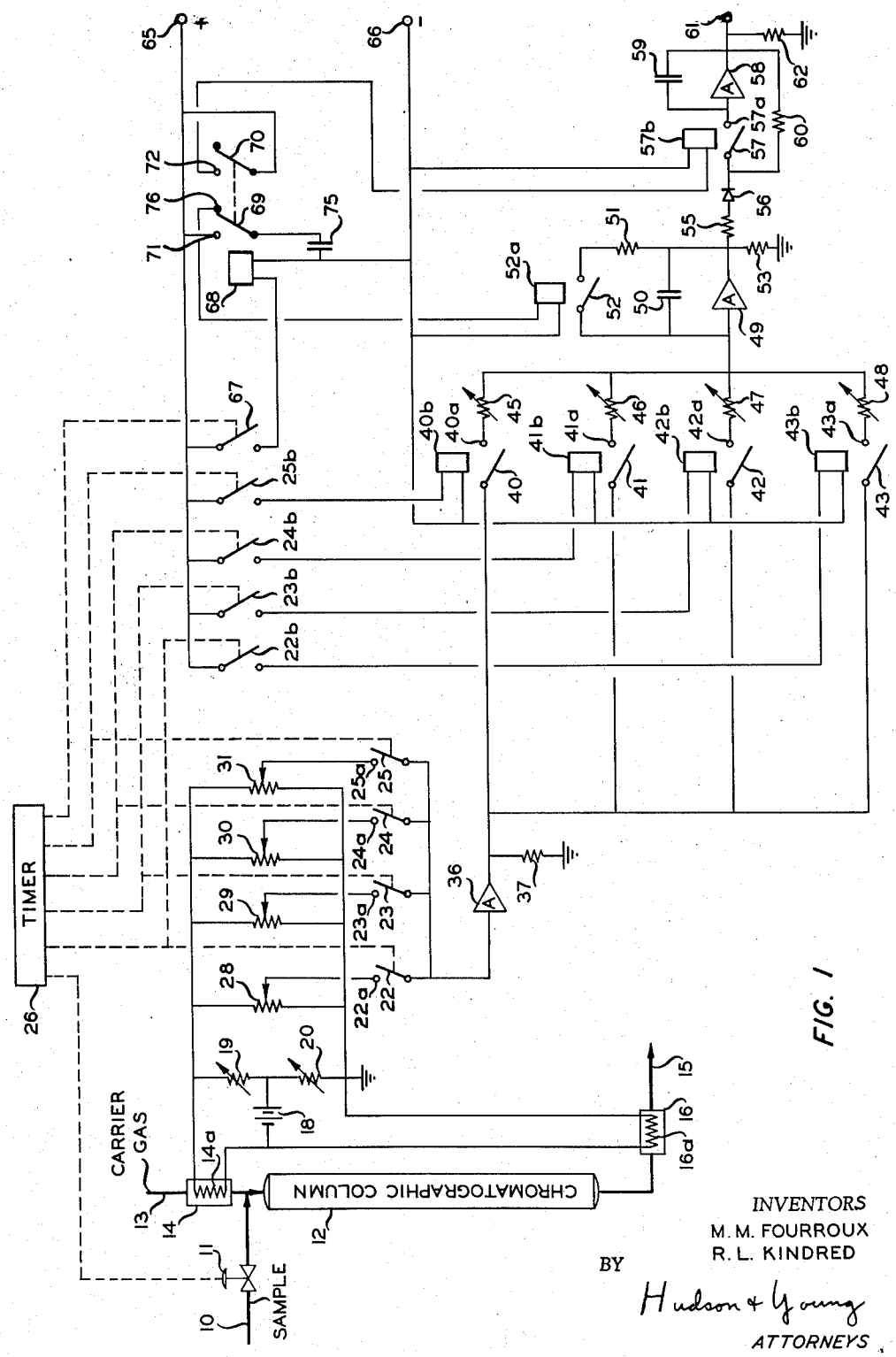
FIGURE 1 is a schematic representation of an embodiment of the analyzer of this invention.

Referring now to FIGURE 1 of the drawing in detail, there is shown a conduit 10 which delivers a sample of the fluid mixture to be analyzed. Conduit 10, which has a control valve 11 therein, communicates with a column 12 which is filled with a material that selectively retards passage therethrough of the constituents of the sample to be analyzed. This column can be filled with an adsorbent or a liquid partitioning agent, for example. A carrier gas is introduced into column 12 through a conduit 13 which has a detector cell 14 therein. The effluent from column 12 is removed through a conduit 15 which has a second detector cell 16 therein. Valve 11 is opened for short intervals of time periodically to introduce preselected volumes of the sample into column 12. This can readily be accomplished by various types of sample valves known in the art. The carrier gas pushes the sample through the column wherein a separation is effected in accordance with the relative affinities of the constituents of the sample for the packing material. In this manner, the individual constituents of the sample appear in the effluent from the column in sequence. This forms a conventional chromatographic analyzer, the operation of which is well known to those skilled in the art.

In order to detect the individual constituents of the sample as they appear in the effluent from column 12, detector cells 14 and 16 are provided to compare properties of the fluids in respective conduits 13 and 15. The thermal conductivities of the fluids in these two conduits can advantageously be compared by comparing the resistances of thermistors 14a and 16a in respective cells 14 and 16. First terminals of these thermistors are connected to one another and to one terminal of a voltage source 18. The second terminal of voltage source 18 is connected to the junction between variable resistors 19 and 20. The second terminal of resistor 19 is connected to the second terminal of termistor 14a, and the second terminal of resistor 20 is connected to the second terminal of thermistor 16a and to ground. Resistors 19 and 20 form a Wheatstone bridge network with the thermistors which compares the resistances of the two thermistors, and thus the thermal conductivities of the fluids in respective conduits 13 and 15.

The end terminals of potentiometers 28, 29, 30 and 31 are connected across series-connected thermistors 14a and 16a. The contactors of potentiometers 28, 29, 30 and 31 are connected to respective terminals 22a, 23a, 24a and 25a, the latter being adapted to be engaged by respective switches 22, 23, 24 and 25 which are closed in sequence by a timer 26.

Timer 26 also opens valve 11 periodically. At the beginning of the analysis cycle, valve 11 is opened for a preselected time to introduce sample fluid into column 12. The valve is then closed so that the carrier gas elutes the constituents of the sample from column 12 in sequence. Timer 26 closes switches 22, 23, 24 and 25 in sequence at later times which correspond to the times at which the individual constituents of the sample appear in the column effluent. Timer 26 can be any conventional mechanism known in the art. For example, this timer can comprise a constant speed motor which rotates a series of cams. The individual cams can operate the switches in sequence. One of the cams can energize a solenoid, for example, to open valve 11. Atlernately, valve 11 can be a rotary selector valve which introduces preselected volumes of sample into column 12.

Switches 22, 23, 24 and 25 are connected to the input of an amplifier 36. A resistor 37 is connected between the output of amplifier 36 and ground. The output of amplifier 36 is also connected to respective switches 40, 41, 42 and 43 which engage respective terminals 40a, 41a, 42a and 43a when closed. These switches are closed in sequence by respective relay coils 40b, 41b, 42b and 43b being energized. Terminals 40a, 41a, 42a and 43a are connected through respective variable resistors 45, 46, 47 and 48 to the input of an integrating amplifier 49. Amplifier 49 is provided with a feedback capacitor 50 which is shunted by a resistor 51 when a switch 52 is closed. A resistor 53 is connected between the output of amplifier 49 and ground.

The output of amplifier 49 is connected through a resistor 55 and a diode 56 to a switch 57 which engages a terminal 57a when a relay coil 57b is energized. Terminal 57a is connected to the input of an amplifier 58 which is provided with a feedback capacitor 59. A resistor 60 is connected between the output of amplifier 58 and the junction between diode 56 and switch 57. The output of amplifier 58 is connected to an output terminal 61, and a load resistor 62 is connected between this terminal and ground. Amplifiers 36, 49 and 58 are conventional operational amplifiers.

Relay coils 40b, 41b, 42b and 43b are energized when respective switches 25b, 24b, 23b and 22b are closed to connect the relay coils across potential terminals 65 and 66. Switches 22b, 23b, 24b and 25b are mechanically connected to respective switches 22, 23, 24 and 25 so as to be closed therewith by timer 26. Potentiometers 28, 29, 30 and 31 are set so as to attenuate the output signals from the bridge network by factors which correspond to the heating value, or other property to be measured, of the respective constituents of the fluid sample which appear in the effluent from column 12. Alternatively, the same result can be accomplished by adjustment of respective resistors 45, 46, 47 and 48.

When the first constituent of the sample appears in the column effluent, switches 22 and 43 are closed by timer 26 so that a signal representative of the heating value contributed by this constituent is stored on capacitor 50 of integrating amplifier 49. Switches 22 and 43 are thereafter opened. When the next sample appears in the column effluent, switches 23 and 42 are closed so that an additional signal is transmitted to capacitor 50 which is representative of the heating value of the second constituent of the sample. Similarly, the third and fourth constituents are subsequently stored on capacitor 50 when switches 24, 41 and 25, 40 are closed.

After the four constituents are measured in the column effluent, timer 26 closes a switch 67 to connect a relay coil 68 across potential terminals 65, 66. This energizes relay coil 68 to move switches 69 and 70 into engagement with respective terminals 71 and 72. When switch 70 engages terminal 72, relay coil 57b is energized to close switch 57. Capacitor 59 then charges or discharges to the value of the signal stored on capacitor 50. This results in the summation of the individual signals being applied to capacitor 59 where the summed signal is stored during the next analysis cycle. Switch 67 is then opened by timer 26 so that switch 57 is open during the following analysis cycle. During the time interval that relay coil 68 is energized, a capacitor 75 is charged by being connected across potential terminals 65, 66. When relay coil 68 is deenergized, capacitor 75 discharges through a relay coil 52a to close switch 52 momentarily. This discharges capacitor 50 and resets the integrator for the following analysis cycle. The signal stored on capacitor 59 is the output signal of the analyzer and is representative of the heating value of the fluid sample. Diode 56 breaks down to conduct when a preselected voltage is applied thereacross. This expands the scale of the instrument. It should be evident that if the fluid sample contains more than four constituents, additional output potentiometer circuits are provided.

Figure 2:
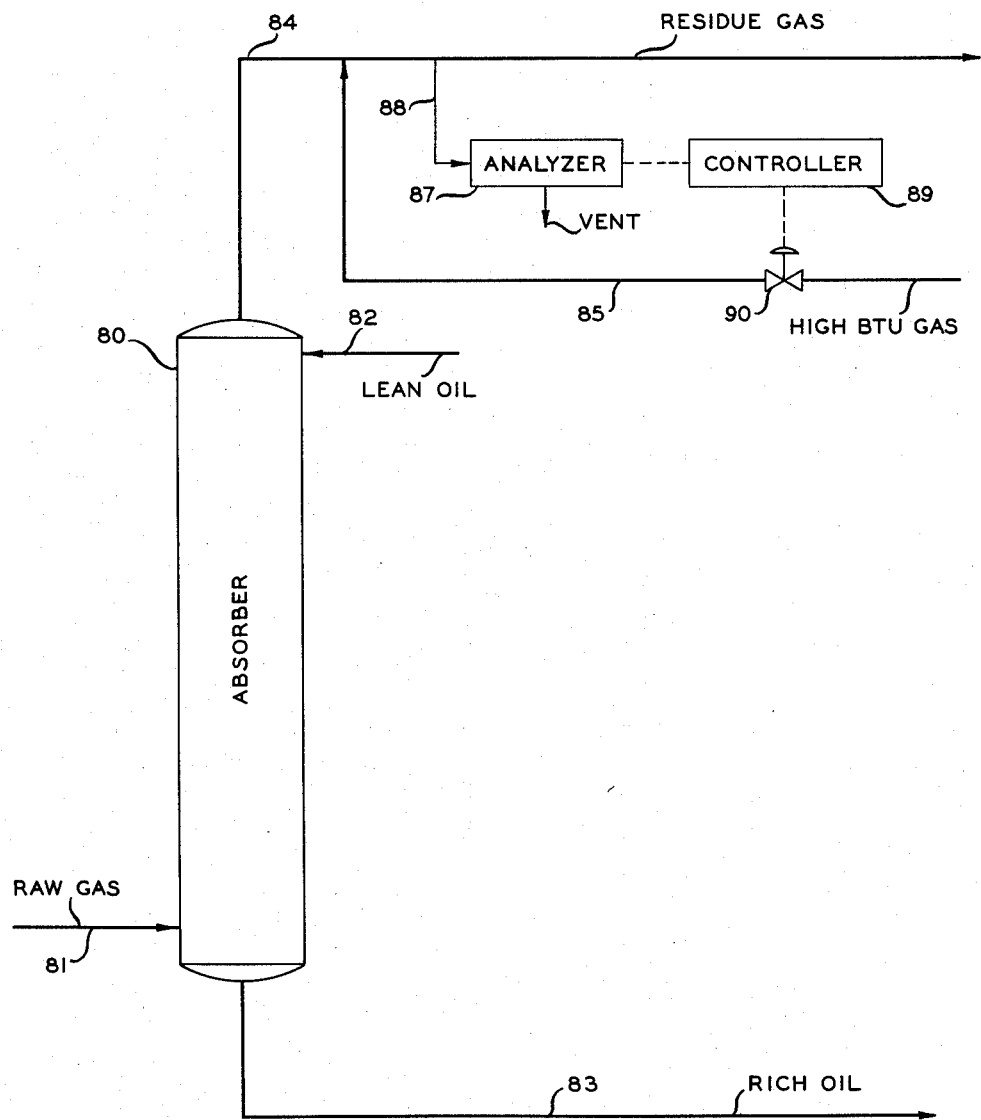
FIGURE 2 is a schematic representation of an extraction control system employing the analyzer of FIGURE 1.

The analyzer of this invention can be employed to advantage to control an absorption system of the type shown in FIGURE 2. Raw natural gas is introduced into the bottom of an absorber 80 through a conduit 81. Lean absorption oil is introduced into the top of absorber 80 through a conduit 82. A stream of rich oil is removed through a conduit 83, and residue gas comprising primarily methane is removed through a conduit 84. A high B.t.u. value enrichment gas, such as propane, is added to the residue gas stream from a conduit 85 as needed to maintain the heating value of the residue gas at the required value. A sample of the residue gas is directed to the analyzer 87 of this invention by a conduit 88. For example, analyzer 87 can measure the concentrations of methane, ethane, propane and butane in the residue gas in sequence and multiply each of such concentrations by the heat of combustion of that component. The output signal of analyzer 87, which is representative of the heating value of the residue gas, is applied through an electrical signal-to-air transducer, for example, to a controller 89 which adjusts a valve 90 in conduit 85. In this manner, high B.t.u. value gas is added to the residue gas as required to maintain the heating value thereof above a preselected value.

Although this invention has been described in conjunction with measuring the heating value of a gaseous mixture, it is to be understood that it is not limited thereto. Any property of a fluid mixture, specific gravity, for example, can be measured if the corresponding properties of the individual constituents are additive to give the property of the mixture.

Various types of chromatographic analyzers can be employed in the analyzer of this invention. Instead of eluting the constituents by carrier gas, heat can be applied to the column to elute the individual constituents. Combinations of heat and carrier gas can also be utilized. It is often desirable to provide two or more columns in series wherein the first column concentrates a sample for subsequent analysis. These and other systems for analysis by chromatography known in the art can be employed.

While this invention has been described in conjunction with present preferred embodiments, it is evident that it is not limited thereto.

What is claimed is:

1. Apparatus for measuring the heating value of a combustible fluid mixture comprising known constituents which comprises a chromatographic column, means to introduce a fluid sample to be measured into said column, means to elute the constituents of said sample from said column in known sequence, means to establish a plurality of first signals representative of the amounts of respective ones of said constituents eluted from said column, means to multiply each of said first signals by a respective factor representative of the heating value of the corresponding constituent to establish a plurality of second signals, and means to sum said second signals.

2. The apparatus of claim 1 wherein said means to multiply said first signals comprises means to attenuate said first signals.

3. The apparatus of claim 1 further comprising a signal storage means, means responsive to said means to sum to apply the sum of said second signals to said storage means, and means to remove signals stored on said storage means.

4. The method of measuring the heating value of a fluid mixture of known constituents which comprises analyzing said mixture to establish a plurality of first signals representative of the concentrations of the respective constituents of the fluid mixture to be measured, multiplying each of said first signals by a factor representative of the heat of combustion of the corresponding fluid constituent to establish a plurality of second signals, and summing said second signals.

5. The method of measuring the specific gravity of a fluid mixture of known constituents which comprises passing the fluid mixture to a zone which is filled with a material that selectively retards passage therethrough of the individual constituents of said mixture, eluting said constituents from said zone in known sequence, measuring a characteristic of the fluids eluted from said zone to establish a plurality of first signals representative of the concentrations of said constituents in said fluid mixture, multiplying each of said first signals by a factor representative of the specific gravity of the corresponding constituent in said fluid mixture to establish a plurality of second signals, and summing said second signals.

6. The method of preparing a fluid of predetermined heating value which comprises passing a first fluid of relatively low heating value to a mixing zone, passing a second fluid of relatively high heating value to said mixing zone, withdrawing from said mixing zone a mixed fluid of known constituents and intermediate heating value, passing a sample portion of the thus-withdrawn mixed fluid to a zone which is filled with a material that selectively retards passage therethrough of the individual constituents of said mixed fluid, eluting said constituents from said zone in known sequence, measuring a characteristic of the fluid eluted from said zone to establish a plurality of first signals representative of the concentrations of said known constituents in said mixed fluid, multiplying each of said first signals by a factor representative of its heating value in said mixed fluid to establish a plurality of second signals, summing said second signals to produce a third signal representative of the heating value of said mixed fluid, and controlling the rate of passing said second fluid to said mixing zone responsive to said third signal so as to maintain the heating value of said mixed fluid at a predetermined value.

7. The method of measuring a physical property of a fluid mixture of known constituents which comprises passing the fluid mixture to a zone which is filled with a material that selectively retards passage therethrough of the individual constituents of said mixture, eluting said constituents from said zone in known sequence, measuring a characteristic of the fluids eluted from said zone to establish a plurality of first signals representative of the concentrations of said constituents in said fluid mixture, multiplying each of said first signals by a factor representative of its contribution to said physical property in said fluid mixture to establish a plurality of second signals, and summing said second signals.

References Cited in the file of this patent

UNITED STATES PATENTS

| | | |
|---|---|---|
| 2,547,970 | Phillips et al | Apr. 10, 1951 |
| 2,712,128 | Woodruff | June 28, 1955 |
| 2,789,761 | Merrill et al. | Apr. 23, 1957 |
| 2,944,418 | Engelhardt | July 12, 1960 |
| 2,951,361 | Fuller | Sept. 6, 1960 |
| 2,967,749 | Strickler | Jan. 10, 1961 |